(12) United States Patent
Ohi et al.

(10) Patent No.: US 8,274,055 B2
(45) Date of Patent: Sep. 25, 2012

(54) RADIATION SIGNAL-PROCESSING UNIT AND RADIATION DETECTOR PROVIDED WITH THE SAME

(75) Inventors: Junichi Ohi, Muko (JP); Masafumi Furuta, Kyoto (JP); Masanobu Sato, Kizugawa (JP)

(73) Assignee: Shimadzu Corporation, Kyoto (JP)

( * ) Notice: Subject to any disclaimer, the term of this patent is extended or adjusted under 35 U.S.C. 154(b) by 16 days.

(21) Appl. No.: 13/042,560

(22) Filed: Mar. 8, 2011

(65) Prior Publication Data
US 2011/0220803 A1  Sep. 15, 2011

(30) Foreign Application Priority Data

Mar. 10, 2010 (JP) ................... 2010-053196

(51) Int. Cl.
*G01T 1/161* (2006.01)
(52) U.S. Cl. ................................. 250/363.07
(58) Field of Classification Search .......... 250/369, 250/363.01–363.1, 362, 370.01–370.15
See application file for complete search history.

(56) References Cited

U.S. PATENT DOCUMENTS

| | | | | |
|---|---|---|---|---|
| 6,064,068 A * | 5/2000 | Bartle | ............................ | 250/369 |
| 6,297,506 B1 * | 10/2001 | Young et al. | .................... | 250/369 |
| 6,324,258 B1 * | 11/2001 | Beekman | ....................... | 378/145 |
| 6,671,541 B2 * | 12/2003 | Bishop et al. | .................. | 600/436 |
| 6,862,087 B2 * | 3/2005 | Kuroda et al. | .............. | 356/141.1 |
| 7,087,905 B2 | 8/2006 | Murayama et al. | | |
| 8,003,948 B2 * | 8/2011 | Haselman et al. | ............ | 250/362 |
| 2008/0128626 A1 * | 6/2008 | Rousso et al. | ................ | 250/362 |
| 2010/0148075 A1 * | 6/2010 | Chinn et al. | ................... | 250/362 |
| 2010/0268074 A1 * | 10/2010 | Van Loef et al. | ............. | 600/431 |

FOREIGN PATENT DOCUMENTS

JP 2004-279057 A 10/2004

* cited by examiner

*Primary Examiner* — Kiho Kim
(74) *Attorney, Agent, or Firm* — Cheng Law Group, PLLC

(57) ABSTRACT

A radiation signal-processing unit including a position identifying device for identifying an incident radiation position in a radiation detector; a count data-memory device for storing positional information outputted from the position identifying device, a count ratio-calculation device for calculating a count ratio based on the positional information stored in the count data-memory device, a reference count ratio-memory device for memorizing a reference count ratio as the count ratio calculated under a state where fluorescence to be detected does not overlap each other temporally, and a correction instruction device for reading the reference count ratio from the reference count ratio-memory device and comparing the ratio with the count ratio, thereby instructing execution of correction of a radiation generating position to the position identifying device.

14 Claims, 6 Drawing Sheets

Prior art

RADIATION SIGNAL-PROCESSING UNIT AND RADIATION DETECTOR PROVIDED WITH THE SAME

BACKGROUND OF THE INVENTION (1) Field of the Invention

This invention relates to a radiation signal-processing unit for correcting detection signals of annihilation radiation-pairs, and a radiation detector provided therewith. More particularly, this invention is directed to a radiation signal-processing unit that allows correction of a detection position of radiation, and a radiation detector provided therewith.

(2) Description of the Related Art

Description will be given of a specific construction of a conventional positron emission tomography (PET) device for imaging distribution on radiopharmaceutical. The conventional PET device includes a radiation ring having radiation detectors arranged circularly for detecting radiation. The detector ring detects a pair of radiation (an annihilation radiation-pair) having opposite directions to each other that is emitted from inside of a subject.

Next, description will be given of a construction of the radiation detector 51. As shown in FIG. 9, the radiation detector 51 includes a scintillator 52 having scintillation counter crystals arranged three-dimensionally, and a light detector 53 for detecting fluorescence from gamma rays absorbed into the scintillator 52. The radiation detector 53 has a detection surface where detecting elements are arranged in a matrix. The detection surface of the light detector 53 is optically connected with one surface of the scintillator 52. See Japanese Patent Publication No. 2004-279057.

Radiation entering into the scintillator 52 is converted into many photons to travel toward the light detector 53. Here, the photons, entering into the scintillator 52 while spatially spreading, enter into each detection surface of the light detector 53 arranged in a matrix. That is, many photons from fluorescence are simultaneously split into detecting elements for detection.

The radiation detector 51 determines a position in the scintillator 2 where fluorescence is emitted through detection data on fluorescence that is captured by two or more detecting elements. That is, the radiation detector 51 determines a position of a center of gravity in a luminous flux of fluorescence in the detection surface by two or more detecting elements. The position of the center of gravity means a position where fluorescence has been generated. Information on the position is used upon mapping of radiopharmaceutical within the subject.

However, the conventional detection of radiation noted above has a following drawback. Specifically, more doses of radiation entering into the radiation detector 51 may lead to incorrect identification of a position where fluorescence is generated.

This drawback concerns to a calculation process of the center of gravity in the luminous flux of fluorescence. Here, the calculation process is to be described. For simplification, it is assumed that the detection surface of the radiation detector 53 has 2 by 2 detecting elements, as shown in FIG. 10. The detection signals of fluorescence outputted from the detecting elements a1 to a4 are assumed to be A1 to A4, respectively. A1 to A4 represent fluorescence intensity detected by the detecting elements a1 to a4, respectively. A position X of the center of gravity in the luminous flux of fluorescence in an x-direction is expressed as follows under assumption of a center position as a starting point:

$$X = \{(A1+A3)-(A2+A4)\}/\{(A1+A2+A3+A4)\} \quad (1)$$

Here, letting (A1+A3) be Xa, and (A2+A4) be Xb, a relation of X=(Xa−Xb)/(Xa+Xb) holds.

Likewise, a position Y of the center of gravity in the luminous flux of fluorescence flux in a y-direction is expressed as follows under assumption of a position a5 as a starting point:

$$Y = \{(A1+A2)-(A3+A4)\}/\{(A1+A2+A3+A4)\} \quad (2)$$

Here, letting (A1+A2) be Ya, and (A3+A4) be Yb, a relation of Y=(Ya−Yb)/(Ya+Yb) holds.

Specifically, more doses of radiation entering into the radiation detector 51 may lead to a phenomenon of apparently increased fluorescence detection intensity. Next, description will be given of this phenomenon. FIG. 11 shows temporal variations in fluorescence that the detecting elements detect. Fluorescence emitted in the scintillator continues to be applied to the detecting elements for a while, although it is weak. Upon detecting of radiation, it takes much time to detect fluorescence in consideration of such afterglow disappearance. Consequently, the radiation detector 51 determines fluorescence taking no account of the afterglow. Specifically, as shown in FIG. 11, the radiation detector 51 integrates detection intensity outputted by the detecting elements a1 to a4 during a period P with a time for calculation of fluorescence detection intensity A1 to A4. Here, the afterglow is not considered as the fluorescence detection intensity.

More doses of radiation enter into the radiation detector 51, and subsequent fluorescence is emitted before afterglow of previous fluorescence disappears. That is, fluorescence having a temporal width will temporally overlap each other. Specifically, as shown in FIG. 12, an afterglow component illustrated by S is to be added in calculation of fluorescence detection intensity.

Such phenomenon occurs in every detection intensity of A1 to A4. Here, letting afterglow components concerning Xa, Xb, Ya, and Yb be expressed with $\alpha, \beta, \gamma, \delta$, respectively, the positions X and Y as the center of gravity calculated under existence of the afterglow components are as follows:

$$X = \{(Xa+\alpha)-(Xb+\beta)\}/\{(Xa+\alpha)+(Xb+\beta)\} \quad (3)$$

$$Y = \{(Ya+\gamma)-(Yb+\delta)\}/\{((Ya+\gamma)+(Yb+\delta)\} \quad (4)$$

The afterglow components $\alpha, \beta, \delta, \gamma$ have an approximately equal value. Consequently, the afterglow components in numerator of Equations 3 and 4 are offset. On the other hand, the afterglow components in denominator of Equations 3 and 4 are not eliminated, but rather added to increase. Accordingly, the positions X, Y have a value different from an actual value under influence of the afterglow components. Specifically, existence of the afterglow components may lead to increased denominator of Equations 3 and 4, thereby decreasing an absolute value of the positions X and Y.

Description will be given of influences that the afterglow components exert on mapping positions of the center of gravity. Now it is assumed that fluorescence is emitted from each center of the scintillation counter crystals that constitute the scintillator 2. Here, a point p in FIG. 13 is a fluorescence generating position. The radiation detector 51 identifies the fluorescence generating position, as shown in FIG. 13, under no influence of the afterglow components.

Where fluorescence to be detected includes the afterglow component, the radiation detector 51 cannot correctly identify the fluorescence generating position shown in FIG. 13. That is, the absolute value of X and Y in Equations 3 and 4 will be increased apparently under the influence of the afterglow. Accordingly, as shown in FIG. 14, the fluorescence generating position to be calculated deviate apparently toward a center of the scintillator 2, which reduces distribution in fluorescence generation. As above, according to the conventional art, the afterglow of fluorescence causes incorrect identification of the fluorescence generating position.

SUMMARY OF THE INVENTION

This invention has been made regarding to the state of the art noted above, and its object is to provide a radiation signal-processing unit that allows correction so as to identify an incident gamma-ray position with no influence of afterglow of fluorescence, and a radiation detector provided therewith.

This invention is constituted as stated below to achieve the above object. A radiation signal-processing unit according to this invention includes a position identifying device, a count data-memory device, a count ratio-calculation device, a reference count ratio-memory device, and a correction instruction device, the position identifying device receiving detection data outputted from a radiation detector with a scintillator that converts radiation into fluorescence and identifying an incident radiation position in the radiation detector based on the detection data, the count data-memory device storing positional information outputted from the position identifying device, the count ratio-calculation device calculating a count ratio as a ratio of count numbers of radiation in different positions in the radiation detector that varies in accordance with temporal overlap of fluorescence each other to be detected based on the positional information stored in the count data-memory device, the reference count ratio-memory device memorizing a reference count ratio as the count ratio calculated under a state where fluorescence to be detected does not overlap each other temporally, the correction instruction device reading the reference count ratio from the reference count ratio-memory device and comparing the ratio with the count ratio, thereby instructing execution of correction of a radiation generating position to the position identifying device. Herein, the count ratio-calculation device and the correction instruction device repeat the above operations for every fixed period.

According to the configuration of this invention, a count ratio is calculated. Here, the count ratio is a ratio of the count number of radiation in two different positions in the radiation detector. The positions include an outermost region in field of view and a region in the field of view closer to inside thereof than the region is in the radiation detector. Continuous repeating and calculating of the count ratio allows sequential monitoring of variations in distribution of fluorescence generation. Fluorescence to be detected temporally overlaps, whereby an influence of the afterglow components affects identification of an incident radiation position, which leads to variations in the count ratio. More specifically, the count ratio varies considerably as distribution of fluorescence generation is considerably reduced. The correction instruction device compares the reference count ratio calculated under no influence of the afterglow components with the count ratio sequentially calculated, thereby instructing execution of correcting the position to the position identifying device depending on the comparison result. In so doing, the incident radiation position that deviates due to influence of the afterglow components may be corrected to be a proper position. Herein, the correction instruction device repeats such instruction on comparison and correction for every fixed period. In so doing, the incident radiation position is to be corrected gradually to be a proper position positively.

Moreover, in the above radiation signal-processing unit, the count ratio-calculation device calculates the count ratio in a vertical direction and a transverse direction individually in the radiation detector. The reference count ratio-memory device memorizes the reference count ratio in the vertical direction and the transverse direction individually in the radiation detector. The correction instruction device compares the count ratio with the reference count ratio individually in the vertical direction and the transverse direction in the radiation detector. The position identifying device corrects the radiation generating position in the vertical direction and the transverse direction individually in the radiation detector. Such configuration is more desirable.

The foregoing configuration represents specific operations of the count ratio-calculation device, the reference count ratio-memory device, the correction instruction device, and the position identifying device. That is, each device individually performs correction by use of the count ratio in the vertical direction and the transverse direction in the radiation detector. Accordingly, the radiation signal-processing unit may correct the position accurately even when the influence of the afterglow components differs in the vertical and transverse directions in the radiation detector.

Moreover, in the above radiation signal-processing unit, the count ratio-calculation device repeats calculation of the count ratio at an interval of 0.001 seconds or more. The correction instruction device repeats instructions of correction at the same interval as that in operation of the count ratio-calculation device. Such configuration is more desirable.

The foregoing configuration represents a specific operation of the correction instruction device. In order to calculate the count ratio accurately, some sufficient count numbers are needed. The count ratio-calculation device repeats calculation of the count ratio at the interval of 0.001 seconds or more, thereby obtaining the count ratio having a sufficiently reliable value.

Moreover, in the above radiation signal-processing unit, the reference count ratio that the reference count ratio-memory device memorizes is obtained through calculation of the count ratio under a state where the radiation detecting surface of the radiation detector has a count ratio of 100 events per second or more per 1 $cm^2$. Such configuration is more desirable.

The above configuration represents a specific configuration of the reference count ratio-memory device. The reference count ratio that the reference count ratio-memory device memorizes is sufficient for calculation of the reference count ratio where the radiation detecting surface of the radiation detector has a count ratio of 100 events per second or more per 1 $cm^2$. A reliable reference count ratio may be obtained.

Moreover, the radiation detector according to this invention includes a scintillator, a light detector for detecting fluorescence, a position identifying device, a count data-memory device, a count ratio-calculation device, a reference count ratio-memory device, and a correction instruction device, the scintillator having scintillation counter crystals for converting radiation into fluorescence arranged two-dimensionally, the position identifying device receiving the detection data outputted from the radiation detector with the scintillator and identifying an incident radiation position in the radiation detector based on the data, the count data-memory device storing positional information outputted from the position identifying device, the count ratio-calculation device calculating a count ratio as a ratio of count numbers of radiation in different positions in the radiation detector that varies in accordance with temporal overlap of fluorescence each other to be detected based on the positional information memorized in the count data-memory device, the reference count ratio-memory device memorizing a reference count ratio as a count ratio calculated under a state where fluorescence to be detected does not overlap each other temporally, the correction instruction device reading the reference count ratio from the reference count ratio-memory device and comparing the ratio with the count ratio, thereby instructing execution of correction of a radiation generating position to the position identifying device. Herein, the count ratio-calculation device and the correction instruction device repeat the above operations for every fixed period.

The above configuration incorporates the radiation signal-processing unit of this invention into the radiation detector. According to the radiation detector having the position identifying device, the count data memory device, the count ratio-calculation device, the reference count ratio-memory device, and the correction instruction device that constitute the radiation signal-processing unit, the radiation detector may be provided that allows accurate identification of the incident radiation position with no influence of the afterglow components of fluorescence.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE PREFERRED EMBODIMENTS

Figure 1:
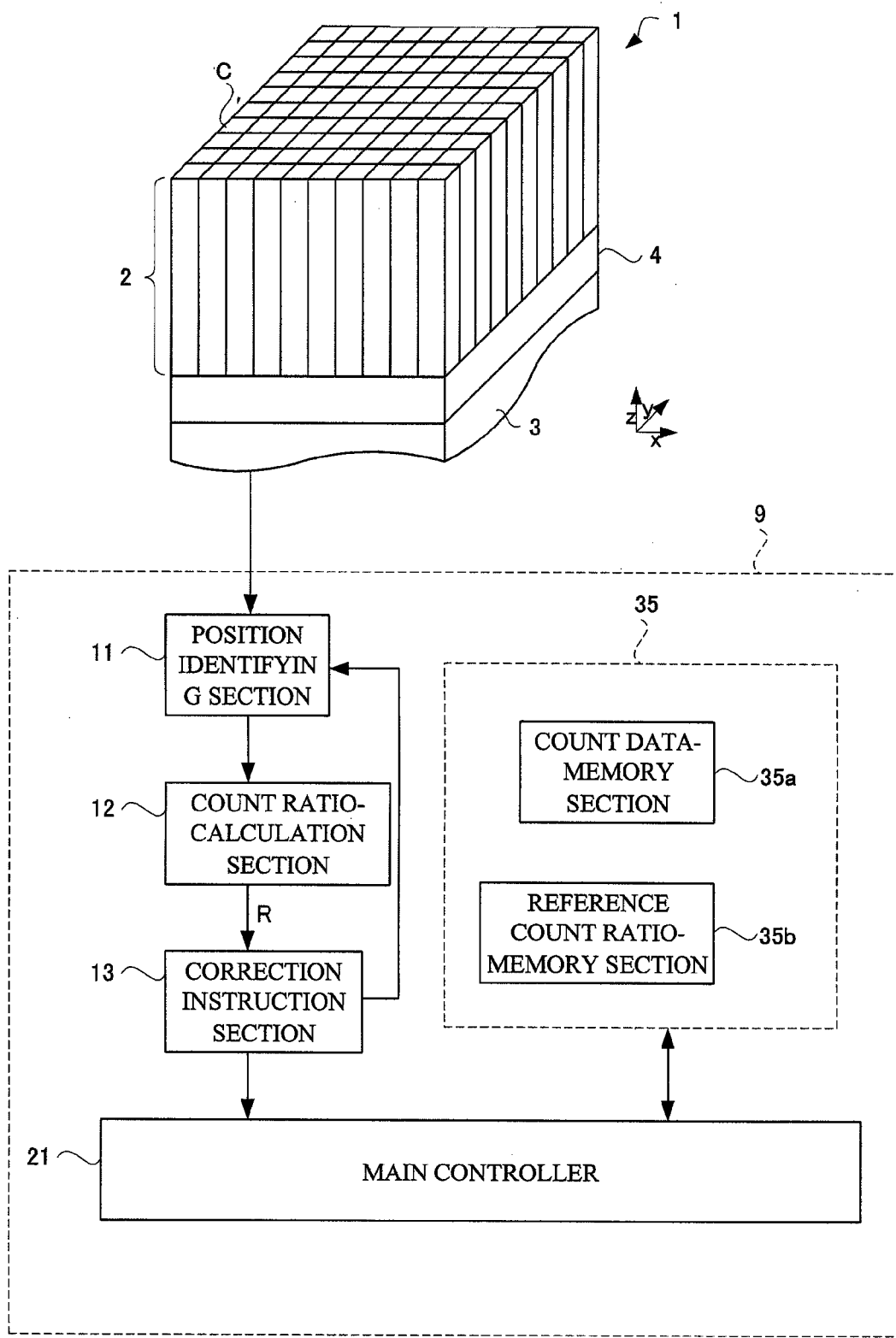
FIG. 1 is a functional block diagram illustrating a construction of a radiation signal-processing unit according to Embodiment 1.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Next, description will be given of one embodiment of a radiation signal-processing unit and a radiation detector according to this invention. Here, gamma rays are an example of radiation.

<Overall Construction of Radiation Signal-Processing Unit and Radiation Detector>

As shown in FIG. 1, the radiation detector 1 according to Embodiment 1 includes a scintillator 2 having scintillation counter crystals C arranged vertically and transversely, a light detector 3 provided on an undersurface of the scintillator 2 for detecting fluorescence emitted from the scintillator 2, and a light guide 4 interposed between the scintillator 2 and the light detector 3. Each of the scintillation counter crystals C is composed of Ce-doped $Lu_{2(1-X)}Y_{2X}SiO_5$ (hereinafter referred to as LYSO.)

Figure 2:
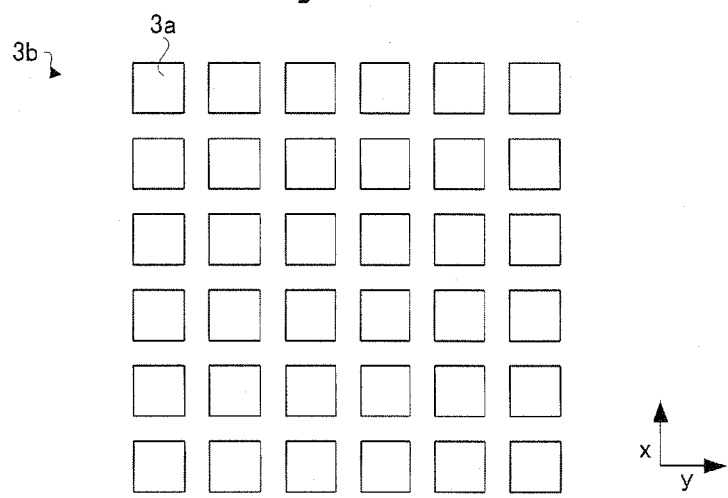
FIG. 2 is a schematic view illustrating a construction of a light detector according to Embodiment 1.

The light detector 3 is multi-anode type, and allows position discrimination of incident fluorescence in the x and y directions. Specifically, as shown in FIG. 2, the light detector 3 has a detecting surface $3b$ having detecting elements $3a$ arranged vertically and horizontally therein in a matrix and optically connected to the scintillator 2. When fluorescence is generated, each of the detecting elements $3a$ outputs intensity data representing fluorescence intensity. The light detector 3 adds information to the data that represents which detecting element $3a$ performs detection, and outputs it to a position identifying section 11 (see FIG. 1.) Accordingly, detected data outputted from the light detector 3 includes both intensity information and positional information of fluorescence. Here, the position identifying section 11 corresponds to the position specifying device in this invention.

The light guide 4 is provided for guiding fluorescence generated in the scintillation 2 into the light detector 3. Consequently, the light guide 4 is optically coupled to the scintillator 2 and the light detector 3.

The radiation detector 1 includes the position identifying section 11, a count ratio-calculation section 12, and a correction instruction section 13. The position identifying section 11 receives detection data outputted from the light detector 3 and identifies a position of the scintillator 2 where fluorescence is emitted 2 based on the data. The count ratio-calculation section 12 calculates a count ratio R, mentioned later, based on positional information outputted from the position identifying section 11. The correction instruction section 13 executes correction of a gamma-ray generating position to the position identifying section 11. The count ratio-calculation section 12 corresponds to the count ratio-calculation device of this invention, and the correction instruction section 13 to the correction instruction device of this invention.

A memory section 35 memorizes all of a parameter, a table, and a map, and the like, with respect to control of the radiation detector 1. The memory section 35 includes a count data-memory section $35a$ for storing the positional information that the position identifying section 11 outputs, and a reference count ratio-memory section $35b$ for memorizing a reference count ratio Rst, mentioned later. The count data-memory section $35a$ corresponds to the count data-memory device of this invention, and the reference count ratio-memory section $35b$ to the reference count ratio-memory device of this invention.

The radiation detector 1 includes a main controller 21 for performing an overall control of each section. The main controller 21 has a CPU, and realizes the above sections 11, 12 and 13 by executing various programs. The above sections may each be divided into a controller that performs their functions.

The position identifying section 11, the count ratio-calculation section 12, the correction instruction section 13, the main controller 21, and the memory section 35 constitute the radiation signal-processing unit 9 for processing data that the light detector 3 in the radiation detector outputs. The radiation signal-processing unit 9 may identify at least an incident gamma-ray position in the radiation detector 1.

<Acquisition of Reference Count Ratio Rst>

Figure 3:
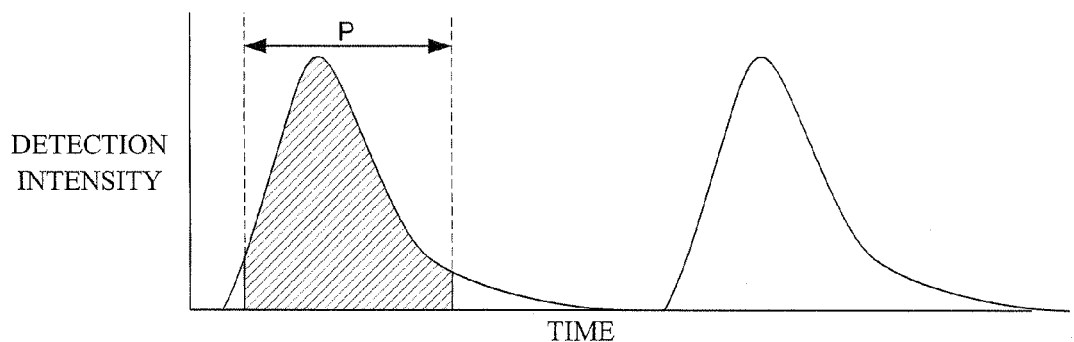
FIGS. 3 to 6 are schematic views each illustrating a method of obtaining a reference count number according to Embodiment 1.

Description will be given of a reference count ratio Rst. The reference count ration Rst is determined in advance prior to use of the radiation detector 1 for diagnosis, etc. The reference ration Rst is acquired over a sufficient period with the radiation source having very small doses of radiation being placed in front of the radiation detector Description will be given of fluorescence detected, at this time. FIG. 3 shows a situation where a detecting element 3a detects fluorescence. Gamma rays entering into the scintillator 2 is converted into fluorescence inside the scintillator 2. FIG. 3 shows a case where two gamma rays enter into the scintillator 2 at different timing. Generated fluorescence does not disappear immediately, but continues to be detected for a while as afterglow. Upon acquiring of the reference count ration Rst, there are very few doses of gamma rays entering. Accordingly, subsequent fluorescence is generated after disappearance of the afterglow. As above, the reference count ratio Rst is calculated while fluorescence to be detected does not temporally overlap each other.

The radiation detector 1 determines fluorescence taking no account of the afterglow. Specifically, as shown in FIG. 3, the radiation detector 1 integrates detection intensity (a slash region in FIG. 3) outputted by the detecting elements 3a during a period P with a time for calculation of fluorescence detection intensity.

The position identifying section 11 receives detection data outputted from the light detector 3, and identifies a position of fluorescence in the scintillator 2 based on the data. Specifically, a map is created having the fluorescence detection intensity corresponding to the position of the detecting element 3a in every fluorescence generation from scintillator 2. The positional information representing the fluorescence generating position is acquired based on the map.

Figure 4:
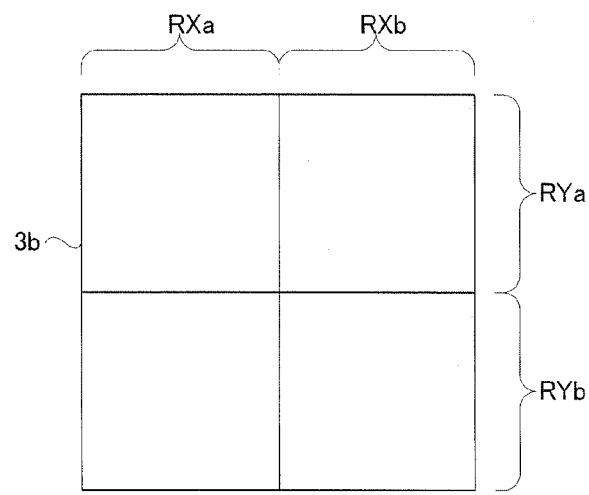

Next, description will be given of a method of acquiring the positional information of fluorescence. As shown in FIG. 4, let a center point in the detecting surface 3b be a starting point, and the fluorescence generating position be illustrated based on this. Let a region on the left side from the starting point be RXa, and a region on the right side from the starting point be RXb. Let a region on the upper side from the starting point be RYa, and a region on the lower side from the starting point be RYb.

The position identifying section 11 sums fluorescence detection intensity in the four regions RXa, RXb, RYa, and RYb that is outputted from the detecting elements 3a while performing predetermined weighting calculation, thereby acquiring total values Xa, Xb, Ya, and Yb. The position identifying section 11 calculates the fluorescence generating position (X, Y) by the following equations:

$$X=(Xa-Xb)/(Xa+Xb) \quad (5)$$

$$Y=(Ya-Yb)/(Ya+Yb) \quad (6)$$

The position identifying section 11 calculates positional information representing the fluorescence generating position by use of Equations 5 and 6 in every identification of the fluorescence generating position, and sends it to the count data-memory section 35a. The count data-memory section 35a memorizes the number of fluorescence to be observed in every receiving of the generation position. Fluorescence is counted for every scintillation counter crystal C. Accordingly, the count data-memory section 35a retains a reference table TS in relation to a position of the scintillation counter crystal C and the count number of fluorescence.

The count ratio-calculation section 12 calculates the reference count ratio Rst from the reference table TS after storing a certain count number of fluorescence memorized in the count data-memory section 35a. Specifically, the count ratio-calculation section 12 starts calculation of the reference count ration Rst after the detecting surface 3b has the count ratio of 100 cycles per second or more per 1 $cm^2$. Description will be given of a method of calculating the reference count ration Rst.

Figure 5:
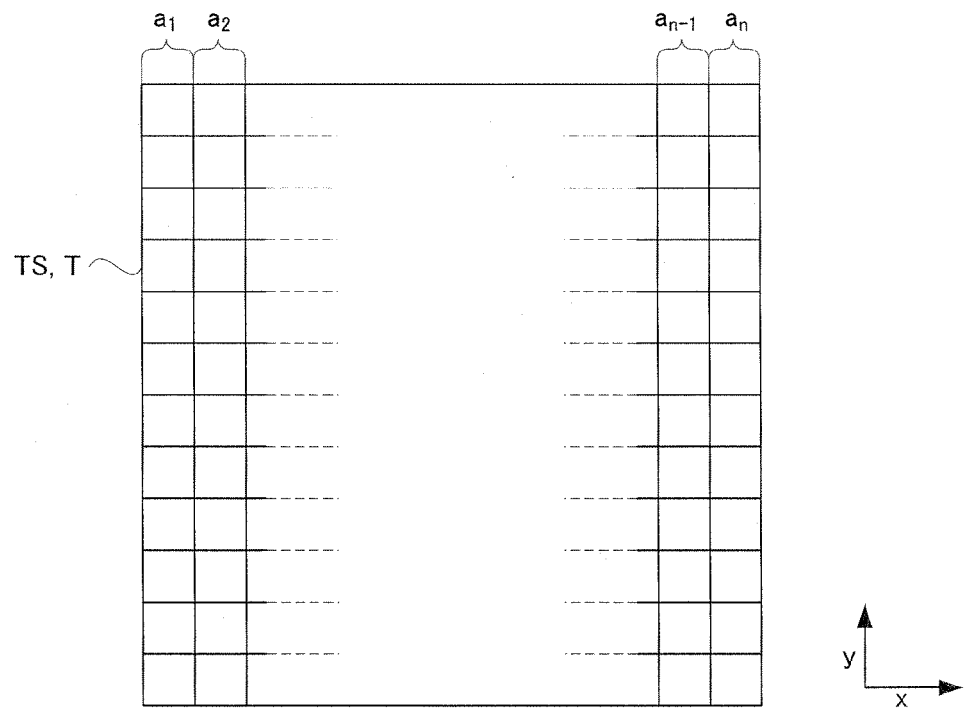

FIG. 5 shows the reference table TS. The reference table TS has cells each representing the scintillation counter crystals C arranged two-dimensionally. Each of the cells has the count number stored therein. Here, let a front row located in the transverse direction (x-direction) of the reference table TS be $a_1$, the second front row be $a_2$, the second row from the last row be $a_{n-1}$, and the last row be $a_n$. The count ratio-calculation section 12 sums the count number of each cell belonging to $a_1, a_2, a_{n-1}$, and $a_n$ for calculation of the total value in each row $\Sigma a_1, \Sigma a_2, \Sigma a_{n-1}$, and $\Sigma a_n$. The reference table TS calculates the reference count ratio Rst in accordance with the following equation:

$$Rst=(\Sigma a_2+\Sigma a_{n-1})/(\Sigma a_1+\Sigma a_n) \quad (7)$$

That is, the count ratio-calculation section 12 sums the count number of fluorescence on the scintillation counter crystals C belonging to two first rows on both ends in the transverse direction (x-direction) of the scintillator 2. Likewise, the count ratio-calculation section 12 sums the count number of fluorescence on the scintillation counter crystals C belonging to two second rows from both ends in the transverse direction (x-direction) of the scintillator 2. The ratio thereof is determined for acquiring the reference count ratio Rst.

Likewise, the count ratio-calculation section 12 determines the reference count ratio Rst in the vertical direction (y-direction) of the scintillator 2. That is, let a front row located in the vertical direction (y-direction) of the reference table TS be $b_1$, the second row from the front row be $b_2$, the second row from the last row be $b_{n-1}$, and the last row be $b_n$ (see FIG. 6.), and let a total value in each row be $\Sigma b_1, \Sigma b_2, \Sigma b_{n-1}$, and $\Sigma b_n$. The reference count ratio Rst is calculated in accordance with the following equation:

$$Rst=(\Sigma b_2+\Sigma b_{n-1})/(\Sigma b_1+\Sigma b_n) \quad (8)$$

As above, the count ratio-calculation section 12 calculates the reference count ratio in the vertical and transverse directions, respectively. Here, let the reference count ratio in the transverse direction be Rst(x), and the reference count ratio in the vertical direction be Rst(y). The reference ratio-memory section 35b memories the reference count ratio Rst(x) and Rst (y). The reference count ratio-memory section 35b memorizes the reference count ratio Rst in the vertical and transverse direction individually in the radiation detector 1.

Since the reference count ratio Rst is acquired in the state where there is no influence of the afterglow of fluorescence, it represents an original detecting situation of the count number of fluorescence at the ends of the scintillator 2.

<Method of Detecting Gamma-Ray Using Radiation Detector>

Figure 7:
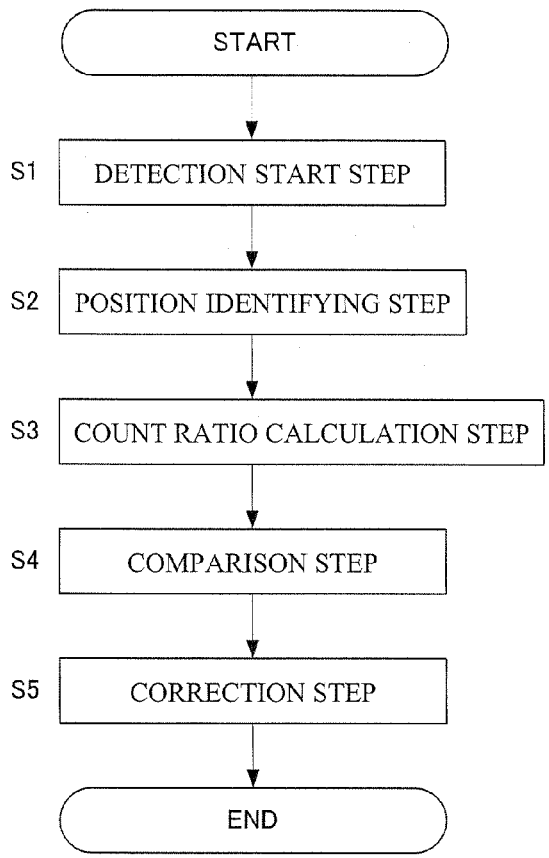
FIG. 7 is a flow chart illustrating operation of the radiation signal-processing unit according to Embodiment 1.

Next, description will be given of a method of detecting gamma rays with the radiation detector 1 (see FIG. 7.) In order to detect gamma rays with the radiation detector 1, detection of gamma rays starts that are derived from the subject (Detection Start Step S1), and an incident gamma-ray position in the radiation detector 1 is identified (Position Identifying Step S2.) Thereafter, a count ratio R is calculated (Count Ratio Calculation Step S3), and the count ratio R is compared with a reference count ratio Rst (Comparison Step S4.) Finally correction is performed to positional information based on the comparison result (Correction Step S5). Each of these steps will be described in order.

<Detection Start Step S1>

A subject with radiopharmaceutical administered thereto lies in front of the radiation detector 1, and detection of gamma rays starts. Here, the reference count ratio Rst has already been calculated.

Figure 8:
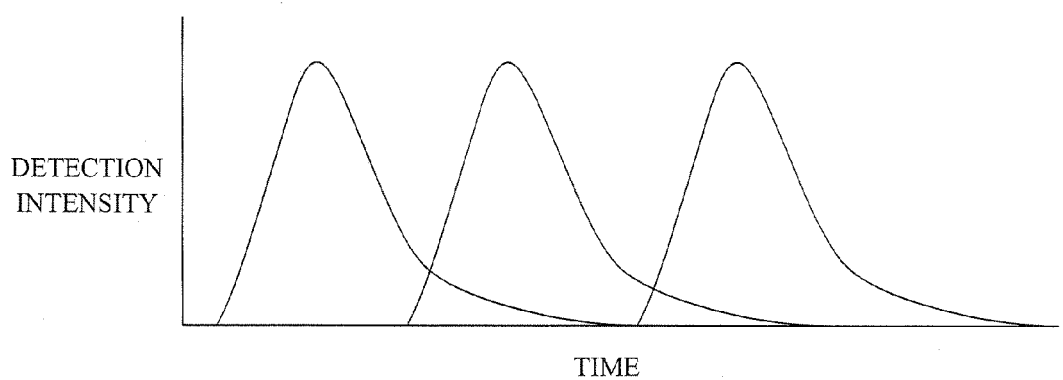
FIG. 8 is a schematic view illustrating operation of the radiation signal-processing unit according to Embodiment 1.
Figure 9:
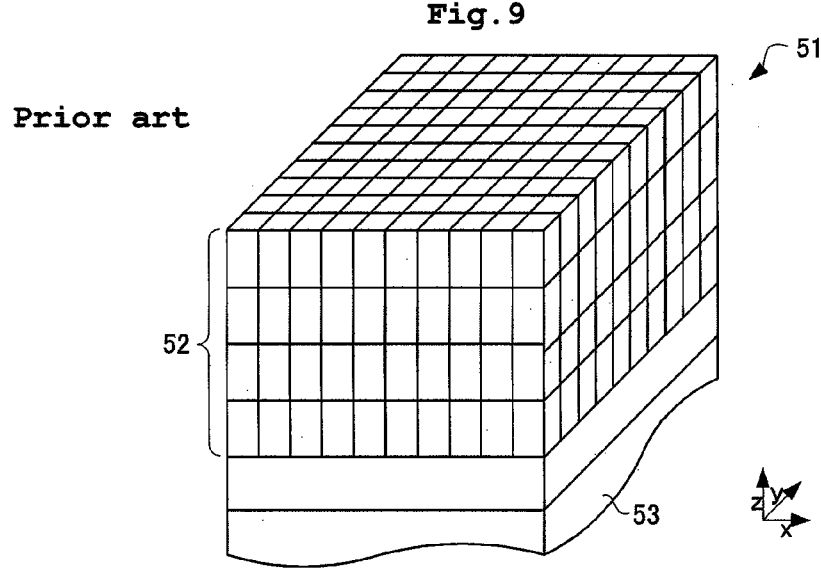
FIGS. 9 to 14 are schematic views each showing a conventional radiation detector.
Figure 10:
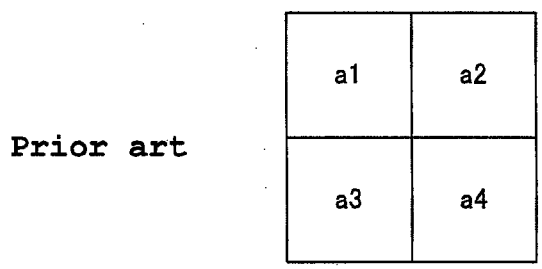
Figure 10:
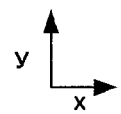
Figure 11:
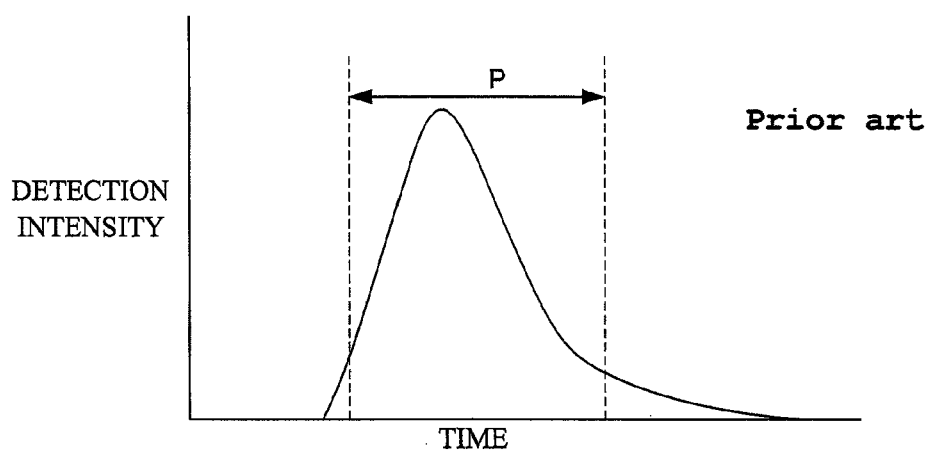

Next, description will be given of fluorescence detected at this time. FIG. 8 shows a situation where a detecting element 3*a* detects fluorescence. Gamma rays are converted into fluorescence within the scintillator 2 upon entering thereinto. FIG. 8 shows a case where three gamma rays enter into the scintillator 2 at different timing. Generated fluorescence does not disappear immediately, but continues to be detected for a while from the detecting element 3*a* as afterglow. Where many doses of gamma rays are emitted in imaging with the subject, there increases a probability of generating subsequent fluorescence before afterglow disappears. Particularly, where long afterglow over several seconds exists, it is detected as steady feeble light and overlaps.

Figure 12:
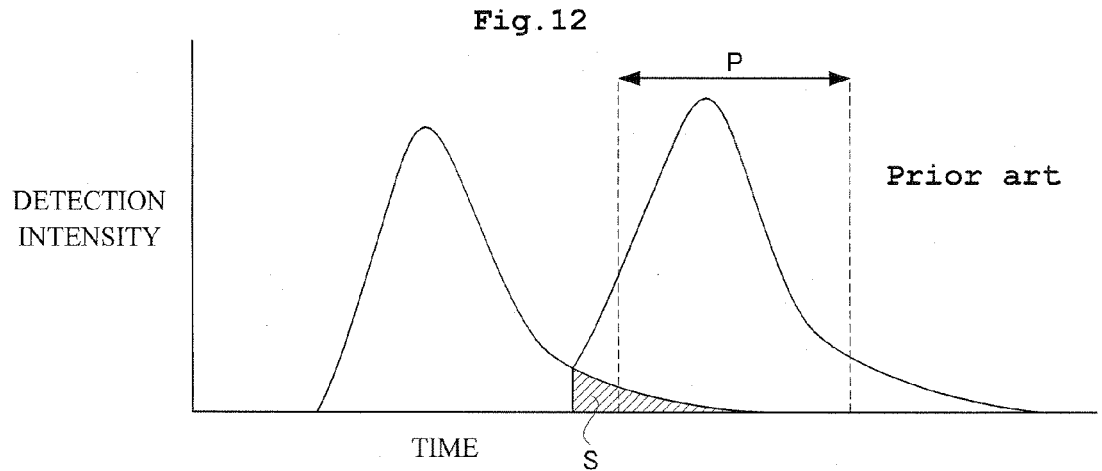

As shown in FIG. 3, the radiation detector 1 integrates detection intensity (a slash region in FIG. 3) outputted by the detecting elements 3*a* during a period P with a time for calculation of fluorescence detection intensity. Here, the afterglow component of previous fluorescence is also added, whereby the fluorescence detection intensity is apparently increases (see FIG. 12.)

<Position Identifying Step S2>

The position identifying section 11 receives detection data outputted from the light detector 3, and identifies a position where fluorescence is emitted in the scintillator 2 based on the data. Specifically, a map is created having the fluorescence detection intensity corresponding to the position of the detecting element 3*a* in every fluorescence generation from the scintillator 2. The positional information representing the fluorescence generating position is acquired based on the map. The positional information is used for imaging of distribution in radiopharmaceutical in the radiation tomography apparatus.

The position identifying section 11 has the same operation as the above description with FIG. 4. Here, letting afterglow components of the total value Xa, Xb, Ya, and Yb be expressed with α, β, γ, δ, respectively, the fluorescence generating position (X, Y) calculated by the position identifying section 11 is as follows:

$$X=\{(Xa+\alpha)-(Xb+\beta)\}/\{(Xa+\alpha)+(Xb+\beta)\} \quad (9)$$

$$Y=\{(Ya+\gamma)-(Yb+\delta)\}/\{(Ya+\gamma)+(Yb+\delta)\} \quad (10)$$

Figure 13:
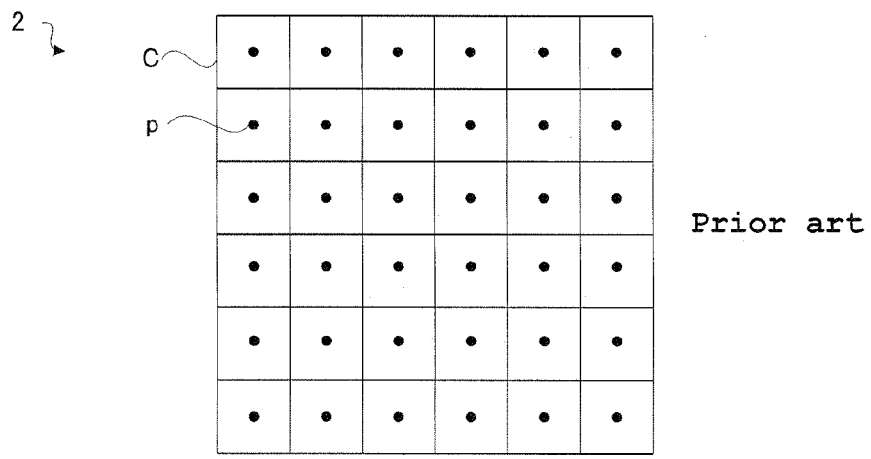
Figure 14:
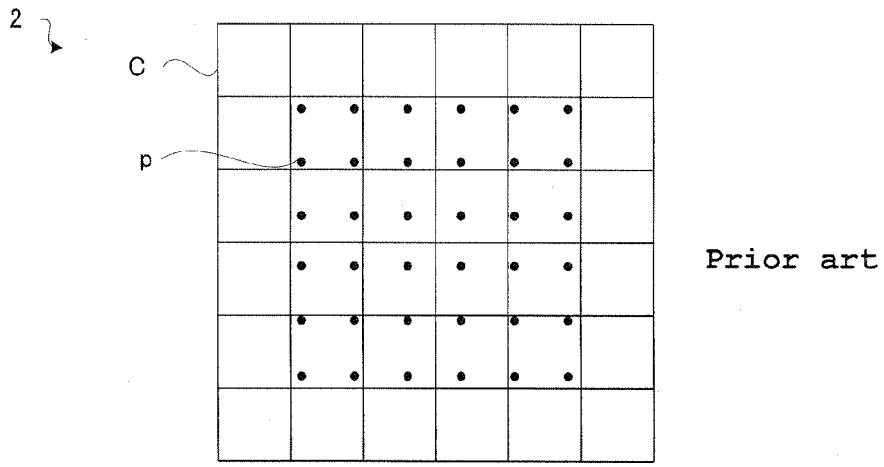

Here, α and β, are of an approximately equal value, and γ and δ are of an approximately equal value. Accordingly, as described with FIGS. 13 and 14, the absolute values of X and Y become apparently small under an influence of the afterglow components. Specifically, the fluorescence generating position close to the end of the scintillator 2 deviates in particular due to the influence of the afterglow components. That is, at the beginning of starting imaging, an actual fluorescence generating position differs from the positional information outputted from the position identifying section 11. The deviation is to be corrected and eliminated through each following steps.

<Count Ratio Calculation Step S3>

The position identifying section 11 sends positional information representing the fluorescence generating position to the count data-memory section 35*a* in every identification of the fluorescence generating position. The count data-memory section 35*a* memorizes the number of fluorescence to be observed in every receiving of the generation position. Fluorescence is counted for every scintillation counter crystal C. Accordingly, the count data-memory section 35*a* retains a reference table T in relation to a position of the scintillation counter crystal C and the count number of fluorescence.

The count ratio-calculation section 12 calculates the reference count ratio R from the reference table T after the count data-memory section 35*a* stores a certain count number of fluorescence. Specifically, the count ratio-calculation section 12 starts calculation of the reference count ration R after a time A has elapsed from starting of storing the number of count. The time A of 0.001 seconds or more is selected. The position identification section 11 also calculates much positional information on fluorescence in the meantime.

The position identifying section 11 continues calculating the positional information successively while the count ratio-calculation section 12 operates. The table T that the count data-memory section 35*a* retains is to be renewed for every time A. Description will be given below of operations for a table T firstly created.

Figure 6:
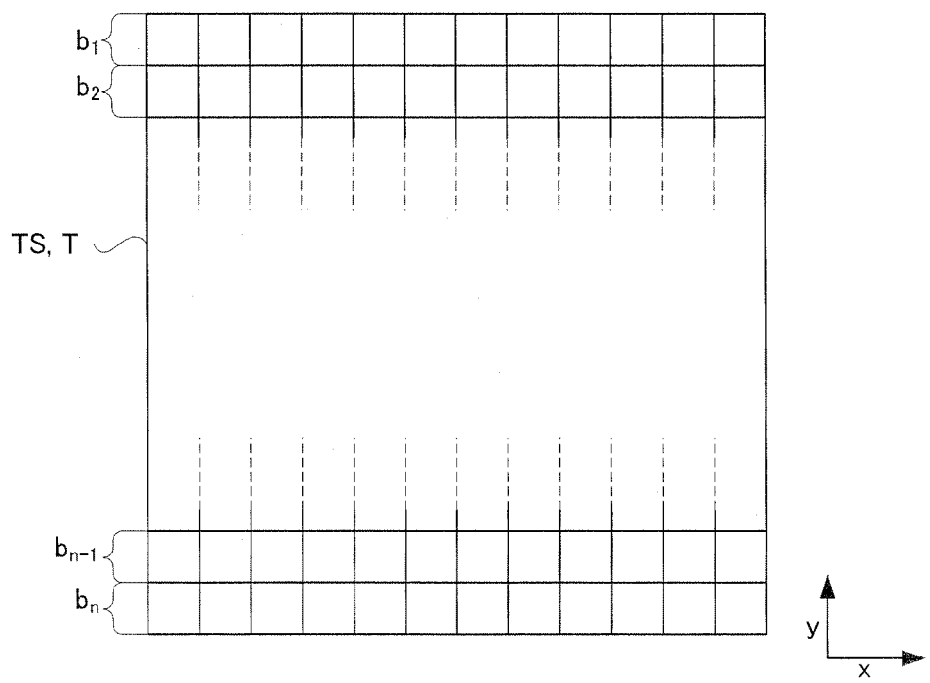

The method of calculating the count ratio R is the same as that of the reference count ratio Rst (see FIGS. 5 and 6.) The count ratio-calculation section 12 calculates the reference count ratio in the vertical and transverse directions, respectively in accordance with the table T. Here, let the reference count ratio in the transverse direction be R(x), and the reference count ratio in the vertical direction be R(y). As noted above, the count ratio-calculation section 12 calculates the reference count ratio in the vertical and transverse directions, respectively, in the radiation detector 1.

<Comparison Step S4>

The count ratio R is sent to the correction instruction section 13. The correction instruction section 13 reads the reference count ratio Rst memorized in the reference count-ratio memory section 35*b*, and compares it with the count ratio R. Actually, the correction instruction section 13 compares the reference count ratio Rst(x) with the count ratio R(x) with respect to the transverse direction, and the reference count ratio Rst(y) with the count ratio R(y) with respect to the vertical direction. As noted above, the correction instruction section 13 compares the reference count ratio Rst with the count ratio R in the vertical and transverse directions, respectively.

The fluorescence generating position close to the ends of the scintillator 2 deviates due to the influence of overlap of the afterglow components. Here, the count ratio R is an index representing a condition of the deviation. If there is no influence of the afterglow components in detection of the subject, the count ratio R is equal to the reference count ratio Rst.

The count number on both ends of the scintillator 2 decreases apparently due to the influence of overlap of the afterglow components, and then the count ratio R deviates from the reference count ratio Rst. Specifically, as the fluorescence generating position deviates toward the center of the scintillator 2 due to the influence of the afterglow components (see FIGS. 13 and 14), the count ratio R is larger than the reference count ratio Rst. That is, comparison of the count ration R with the reference count ration Rst may realize recognition how long the fluorescence generating position deviates from the actual position. As above, the count ration R varies in accordance with temporal overlap of fluorescence each other to be detected.

<Correction Step S5>

Where it is found that the reference count ratio Rst and count ratio R are not equal, the correction instruction section 13 instructs the position identifying section 11 to correct positional information. The position identifying section 11 modifies calculation of the fluorescence generating position (X,Y) as follows. Here, Px and Py are correction values added for the purpose of correction.

$$X=\{(Xa+\alpha)-(Xb+\beta)\}/\{(Xa+\alpha)+(Xb+\beta)-Px\} \quad (11)$$

$$Y=\{(Ya+\gamma)-(Yb+\delta)\}/\{(Ya+\gamma)+(Yb+\delta)-Py\} \quad (12)$$

Specifically, the position identifying section 11 subtracts the correction value Px from denominator of Equation 11 concerning calculation of the position in the transverse direction, and subtracts the correction value Py from denominator of Equation 12 concerning calculation of the position in the vertical direction, thereby calculating the position (X, Y). Since the correction value is a positive value, the afterglow components and the correction value P are offset in the denominator. Consequently, the position identifying section 11 may identify the fluorescence generating position accurately under no influence of the afterglow components. As noted above, the position identifying section 11 corrects the fluorescence generating position in the vertical and transverse directions, respectively.

The above count ratio calculation step S3, the comparison step S4, and the correction step S5 are performed repeatedly for every fixed period determined with the time A. Accordingly, the count ratio R is calculated in every lapse of the time A. The count ratio R is compared with the reference count ratio Rst, whereby correction is instructed. The correction value P is set to increase in every determination of the correction instruction section 13 that the reference count ratio Rst is larger than the count ration R. Moreover, the correction value P is set to decrease in every determination of the correction instruction section 13 that the reference count ratio Rst is smaller than the count ratio R. Consequently, the fluorescence generating position is gradually corrected accurately with the position identifying section 1.

The influence of the afterglow components may vary during detection on the subject. The correction value P is controlled in accordance with variations in the count ratio R, whereby the fluorescence generating position has been maintained accuracy with no problem in such a situation.

According to the configuration of Embodiment 1, the count ratio R is calculated as mentioned above. Here, the count ratio is a ratio of the count number of gamma rays in two different positions in the radiation detector 1. The positions include an outermost region $a_1$, $a_n$, $b_1$, $b_n$ in field of view (in the scintillator 2) and a region $a_2$, $a_{n-1}$, $b_2$, $b_{n-1}$ in the field of view closer to inside thereof than the region is in the radiation detector 1. Continuous repeating and calculating of the count ratio R allows monitoring of variations in distribution of fluorescence generation. Fluorescence to be detected temporally overlaps, whereby an influence of the afterglow components affects identification of the incident gamma-ray position (fluorescence generating position), which leads to variations in the count ratio R. More specifically, the count ratio R varies considerably as distribution of fluorescence generation is considerably reduced. The correction instruction section 13 compares the reference count ratio Rst calculated under no influence of the afterglow components with the count ratio R sequentially calculated, thereby instructing execution of correcting the position to the position identifying section 11 depending on the comparison result. In so doing, the incident gamma-ray position (fluorescence generating position) that deviates due to influence of the afterglow components may be corrected to be a proper position. Herein, the correction instruction section 13 repeats instruction on comparison and correction as above for every fixed period. In so doing, the incident gamma-ray position (fluorescence generating position) will be corrected gradually to be a proper position positively.

Moreover, the count ratio-calculation section 12, the reference count ratio-memory section 35b, the correction instruction section 13, and the position identifying section 11 individually perform correction by use of the count ratio R in the vertical direction and the transverse direction in the the scintillator 2 of the radiation detector 1. Accordingly, the radiation signal-processing unit 9 may correct the position accurately even when the influence of the afterglow components differs in the vertical and transverse directions in the radiation detector 1.

In order to calculate the count ratio R accurately, some sufficient count numbers are needed. The count ratio-calculation section 12 repeats calculation of the count ratio R at an interval of 0.001 seconds or more, thereby obtaining the count ratio R having a sufficiently reliable value.

Moreover, the reference count ratio R that the reference count ratio-memory section 35b memorizes is sufficient for calculation of the reference count ratio R where the radiation detecting surface of the radiation detector 1 has a count ratio of 100 seconds or more per second per 1 $cm^2$. A reliable reference count ratio R may thus be obtained.

(1) In each of the foregoing embodiments, the scintillation counter crystal is composed of LYSO. Alternatively, the scintillation counter crystal may be composed of another materials, such as LGSO ($Lu_{2(1-x)}G_{2x}SiO_5$) and GSO ($Gd_2SiO_5$), may be used in this invention. According to this modification, a method of manufacturing a radiation detector may be provide that allows provision of a radiation detector of low price.

(2) The light detector in each of the foregoing embodiments is formed of the photomultiplier tube. This invention is not limited to this embodiment. A photodiode, an avalanche photodiode, a semiconductor detector, etc. may be used instead of the photomultiplier tube.

(3) In each of the foregoing embodiments, the count ratio-calculation section 12, the reference count ratio-memory section 35b, the correction instruction section 13, and the position identifying section 11 individually perform correction by use of the count ratio R in the vertical direction and the transverse direction in the scintillator 2 of the radiation detector 1. The count number of fluorescence may be summed with respect to a round of scintillation counter crystals C placed in the first from the outermost periphery of the scintillator 2. Likewise, the count number of fluorescence may be summed with respect to a round of scintillation counter crystals C placed in the second from the outermost periphery of the scintillator 2. Thereafter, a ratio thereof may be calculated for calculating the reference count ratio R.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A radiation signal-processing unit for correcting detection signals of annihilation radiation-pairs, comprising:
   a position identifying device for receiving detection data outputted from a radiation detector with a scintillator that converts radiation into fluorescence and identifying an incident radiation position in the radiation detector based on the detection data;

a count data-memory device for storing positional information outputted from the position identifying device;

a count ratio-calculation device for calculating a count ratio as a ratio of count numbers of radiation in different positions in the radiation detector that varies in accordance with temporal overlap of fluorescence each other to be detected based on the positional information memorized in the count data-memory device;

a reference count ratio-memory device for memorizing a reference count ratio as the count ratio calculated under a state where fluorescence to be detected does not overlap each other temporally; and a correction instruction device for reading the reference count ratio from the reference count ratio-memory device and comparing the ratio with the count ratio, thereby instructing execution of correction of a radiation generating position to the position identifying device, the count ratio-calculation device and the correction instruction device repeating the operations for every fixed period.

2. The radiation signal-processing unit according to claim 1, wherein the count ratio-calculation device calculates the count ratio in a vertical direction and a transverse direction individually in the radiation detector;

the reference count ratio-memory device memorizes the reference count ratio in the vertical direction and the transverse direction individually in the radiation detector;

the correction instruction device compares the count ratio with the reference count ratio individually in the vertical direction and the transverse direction in the radiation detector; and the position identifying device corrects the radiation generating position in the vertical direction and the transverse direction individually in the radiation detector.

3. The radiation signal-processing unit according to claim 2, wherein the count ratio-calculation device repeats calculation of the count ratio at an interval of 0.001 seconds or more; and the correction instruction device repeats instructions of correction at the same interval as that in operation of the count ratio-calculation device.

4. The radiation signal-processing unit according to claim 2, wherein the reference count ratio that the reference count ratio-memory device memorizes is obtained through calculation of the count ratio under a state where the radiation detecting surface of the radiation detector has a count ratio of 100 events per second or more per 1 $cm^2$.

5. The radiation signal-processing unit according to claim 1, wherein the count ratio-calculation device repeats calculation of the count ratio at an interval of 0.001 seconds or more; and the correction instruction device repeats instructions of correction at the same interval as that in operation of the count ratio-calculation device.

6. The radiation signal-processing unit according to claim 5, wherein the reference count ratio that the reference count ratio-memory device memorizes is obtained through calculation of the count ratio under a state where the radiation detecting surface of the radiation detector has a count ratio of 100 events per second or more per 1 $cm^2$.

7. The radiation signal-processing unit according to claim 1, wherein the reference count ratio that the reference count ratio-memory device memorizes is obtained through calculation of the count ratio under a state where the radiation detecting surface of the radiation detector has a count ratio of 100 events per second or more per 1 $cm^2$.

8. A radiation detector for correcting detection signals of annihilation radiation-pairs, comprising:

a scintillator having scintillation counter crystals for converting radiation into fluorescence arranged two-dimensionally;

a light detector for detecting fluorescence;

a position identifying device for receiving the detection data outputted from the radiation detector with the scintillator and identifying an incident radiation position in the radiation detector based on the data;

a count data-memory device for storing positional information outputted from the position identifying device;

a count ratio-calculation device for calculating a count ratio as a ratio of count numbers of radiation in different positions in the radiation detector that varies in accordance with temporal overlap of fluorescence each other to be detected based on the positional information memorized in the count data-memory device;

a reference count ratio-memory device for memorizing a reference count ratio as a count ratio calculated under a state where fluorescence to be detected does not overlap each other temporally; and a correction instruction device for reading the reference count ratio from the reference count ratio-memory device and comparing the ratio with the count ratio, thereby instructing execution of correction of a radiation generating position to the position identifying device, the count ratio-calculation device and the correction instruction device repeating the above operations for every fixed period.

9. The radiation detector according to claim 8, wherein the count ratio-calculation device calculates the count ratio in a vertical direction and a transverse direction individually in the radiation detector;

the reference count ratio-memory device memorizes the reference count ratio in the vertical direction and the transverse direction individually in the radiation detector;

the correction instruction device compares the count ratio with the reference count ratio individually in the vertical direction and the transverse direction in the radiation detector; and the position identifying device corrects the position where radiation generates in the vertical direction and the transverse direction individually in the radiation detector.

10. The radiation detector according to claim 9, wherein the count ratio-calculation device repeats calculation of the count ratio at an interval of 0.001 seconds or more; and the correction instruction device repeats instructions of correction at the same interval as that in operation of the count ratio-calculation device.

11. The radiation detector according to claim 9, wherein the reference count ratio that the reference count ratio-memory device memorizes is obtained through calculation of the count ratio under a state where the radiation detecting surface of the radiation detector has a count ratio of 100 events per second or more per 1 $cm^2$.

12. The radiation detector according to claim 8, wherein the count ratio-calculation device repeats calculation of the count ratio at an interval of 0.001 seconds or more; and the correction instruction device repeats instructions of correction at the same interval as that in operation of the count ratio-calculation device.

13. The radiation detector according to claim 12, wherein the reference count ratio that the reference count ratio-memory device memorizes is obtained through calculation of the count ratio under a state where the radiation detecting surface of the radiation detector has a count ratio of 100 events per second or more per 1 $cm^2$.

14. The radiation detector according to claim 8, wherein the reference count ratio that the reference count ratio-memory device memorizes is obtained through calculation of the count ratio under a state where the radiation detecting surface of the radiation detector has a count ratio of 100 events per second or more per 1 $cm^2$.

* * * * *